United States Patent [19]

Martin

[11] Patent Number: 4,616,930
[45] Date of Patent: Oct. 14, 1986

[54] OPTICALLY BIASED TWIN RING LASER GYROSCOPE

[75] Inventor: Graham J. Martin, Canoga Park, Calif.

[73] Assignee: Litton Systems, Inc., Beverly Hills, Calif.

[21] Appl. No.: 486,662

[22] Filed: Apr. 20, 1983

[51] Int. Cl.[4] ............................................. G01C 19/64
[52] U.S. Cl. ........................................ 356/350; 372/94
[58] Field of Search ........................... 356/350; 372/94

[56] References Cited

U.S. PATENT DOCUMENTS 3,468,608  9/1969  Doyle .................................. 356/350
3,826,575  7/1974  Walter, Jr. .......................... 356/350
4,229,106  10/1980  Dorschner et al. ................ 356/350
4,521,110  6/1985  Roberts et al. ..................... 356/350

Primary Examiner—Vincent P. McGraw

[57] ABSTRACT

An improved ring laser rotational rate sensor includes a pair of lasing cavities, each of which is comprised of a non-planar arrangement of four cavity segments. Common gain and biasing media are associated with closely-spaced segments of the two cavities. The non-planar cavity geometry supports only circularly optically polarized lasing modes thereby requiring no intracavity elements for optical biasing and eliminating the need for dithering of mirrors to control optical path length.

5 Claims, 3 Drawing Figures

OPTICALLY BIASED TWIN RING LASER GYROSCOPE

BACKGROUND OF THE INVENTION

1. Field of the Invention

The present invention relates to apparatus for measuring the rate of rotation of a body. More particularly, this invention pertains to an improved rotational rate sensor of the ring laser type.

2. Description of the Prior Art

The ring laser rotational rate sensor or gyroscope is a well-known, though relatively recent, technology. This instrument relies upon the beat frequencies produced by the interaction of counterrotating laser beams in a closed cavity when a frequency difference is developed therebetween. Such frequency difference occurs in response to the relative lengthening of the path of one of the beams over that of the other. The instrument, as above-described, has proven to be especially useful as a "strapdown" navigational instrument. As such, its use simplifies navigation system design by eliminating the need for gimbaled platforms and the like. Also, the potentially high accuracy of the ring laser gyroscope further adds to the attractiveness of this technology.

A limiting drawback to use of the ring laser gyroscope resides in the phenomenon of "lock-in" that occurs at relatively low rates of rotation. This phenomenon creates a nonlinear instrument response at low rates of rotation, both clockwise and counter-clockwise.

Attempts, both mechanical and electro-optical have been made to overcome this gyroscope "blind spot". High frequency mechanical dithering of the instrument has been employed to shift instrument operation to the region of linear response. Magneto-optical attempts have included the introduction of a Faraday cell arrangement into the laser cavity. By so doing a constant bias may be applied to the instrument to shift the operation of the device outside the nonlinear low rotational rate region. Both of these techniques have proven difficult to implement, mechanical dithering often introducing significant vibrational effects into complex navigational systems and the Faraday cell biasing being difficult to implement successfully as it requires a substantially constant magnetic field to maintain a constant optical bias.

U.S. Pat. No. 3,826,575 of Walter for "High Performance Ring Laser Gyroscope With Magneto-Optical Bias" discloses a method for overcoming the long term stability problems associated with the Faraday cell. This patent discloses the use of two triangular lasing cavities, one segment of each of which contains a material with a fairly high Verdet constant, such as flint glass. Close spacing of this pair of matching cavity segments allows the use of a common DC voltage source, such as a battery, to provide a current source for a field coil and thus to apply equal and opposite biases to the cavities. By the use of appropriate output combining optics and electronics, the biases will be cancelled and an overall output for the instrument will be produced that is inherently insensitive to variations in the applied magneto-optical bias. Thus, such a common or differential biasing arrangement can be utilized to avoid the effects of lock-in by shifting the operation of independent cavities in opposite directions to regions of linear response and then removing the effects of applied bias drift error by cancellation.

While the device disclosed in Walter represents an advance in the measurement of low rates of rotation, his device requires the introduction of quarter wave plates and other elements into the lasing cavities that are both lossy and, to some extent, introduce backscattering effects that exacerbate the lock-in problem.

SUMMARY OF THE INVENTION

The present invention solves the aforementioned and additional problems of the prior art by providing a ring laser rotational rate sensor of the type wherein counterrotating beams of laser light are utilized to measure rates of rotation. The sensor includes first and second lasing cavities, each cavity comprising four substantially straight segments arranged to form an out-of-plane shape. A laser gain medium is provided within each cavity. Means are provided for optically biasing the output beat frequencies from both the first and second cavities by equal and opposite amounts. Finally, means are provided for combining the output beat frequencies from the first and second lasing cavities to produce a measurement of rotation of said sensor.

The above-referenced and additional features and advantages of the present invention will best be appreciated from the detailed description which follows. This description is accompanied by a set of drawing figures. Numerals in the drawing figures, corresponding to numerals utilized in the detailed description, are associated with and indicate the features of the invention, like numerals indicating like features throughout.

DETAILED DESCRIPTION

Figure 1:
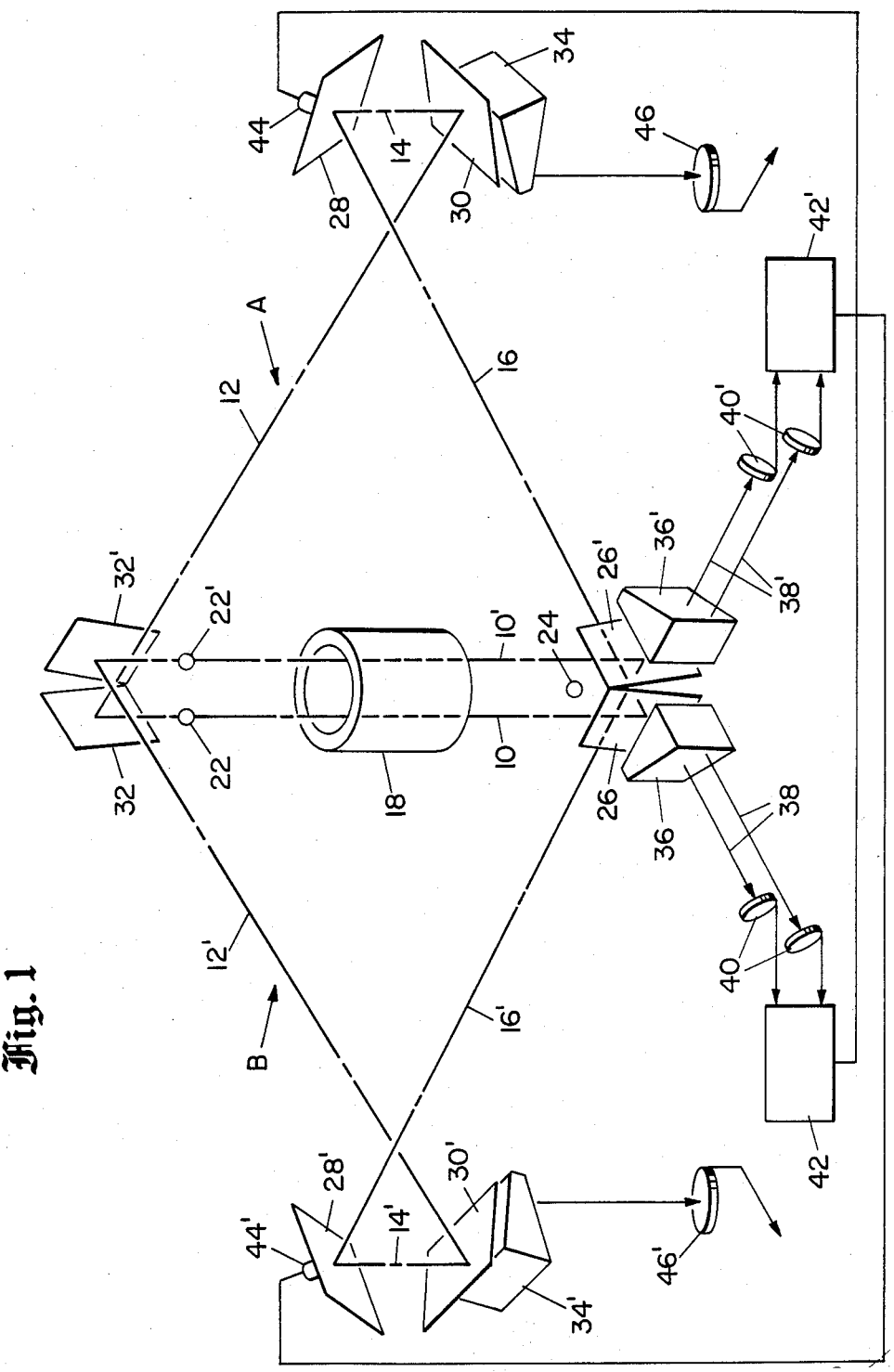
FIG. 1 is a perspective optical schematic of the present invention.

Turning now to the drawings, FIG. 1 presents a perspective optical schematic view of a ring laser rotational rate sensor in accordance with the invention. The sensor generally comprises the right-hand side closed lasing cavity A of four substantially straight segments 10, 12, 14, and 16 and the left-hand side cavity B of the corresponding segments 10', 12', 14' and 16'. The right-hand and left-hand lasing cavities are arranged symmetrically with respect to each other and, as can be seen, overlap so that members 10 and 10' extend within the interiors of the left and right-hand cavities respectively. The closely-spaced segments 10, 10' serve as the common location of a differential biasing medium and a gain medium for exciting lasing action within the cavities A and B. A tubular permanent magnet 18 provides a common magnetic field in the cavities that interacts with the lasing light to provide counterbalancing optical phase shifts in the beams within such cavities. Alternatively, the magnetic field could be provided by a battery-energized coil, the advantages of a permanent magnet residing in improved field stability in combination with an absence of the power consumption and heating effects normally associated with an electromagnet. Anodes 22 and 22', in conjunction with a common cathode 24, produce the ionization of gases within the cavities required to produce the desired lasing action; thus both the generation of lasing action and the magneto-optical biasing of the generated laser light occur within the same physical region (i.e. corresponding segments 10 and 10') of cavities A and B.

The counterrotating beams in the cavities are directed by the arrangement of right-hand cavity mirrors 26, 28, 30 and 32 and by the corresponding arrangment of left-hand cavity mirrors 26', 28', 30', and 32'. Mirrors 28, 28', 32 and 32' are preferably fully reflective while mirrors 26, 26', 30 and 30' are partially transmissive. A portion of the light striking the partially transmissive mirrors 26 and 26' enters combining prisms 36 and 36', respectively, while a portion of that striking mirrors 30 and 30' enters the combining-type prisms 34 and 34'. Both sets of prisms act upon the counterrotating beams within an associated cavity. The combining prisms 36, 36' divert the counterrotating components into a pair of parallel beam outputs 38, 38', the intensity of each of which is proportional to that of one of the counterrotating beams within the cavity. The beams are directed to a pair of silicon photodetectors 40 or 40' wherein their relative intensities are converted into corresponding electrical signals. These signals are used for cavity path length control as is detailed below while the outputs from the prisms 34 and 34' are used for measurement of rotation.

As is well known, a separation in the curves of cavity length (or frequency) versus gain or intensity of counterrotating beams is created by the imposition of a magnetic field B upon the gain medium. The measure of separation of gain curves is given by $\mu_B B g_L$ where $\mu_B$ and $g_L$ are constants representing the Bohr magneton and Lande g function respectively. As gases within segments 10 and 10' comprise both the gain medium and Faraday rotator including magnetic field for biasing the optical frequencies within the cavities A and B, the arrangement of the elements of the gyroscope is such that the counterrotating beams of light within each cavity reach maximum intensity at different cavity lengths. Further, due to the separation of gain-versus-cavity length curves, there exists a single cavity length for which the intensities of the counterrotating beams are identical. The various design parameters of the invention are therefore selected so that nominal cavity length is that for which the intensities of the counterrotating beams are identical. This allows a relatively straightforward optical servo control of cavity path length rather than mechanical dithering of mirrors to detect the only available "lock point" of the curve for counterrotating beams without gain separation, the relatively difficult-to-determine maximum intensity.

Path length is controlled by adjusting the positions of mirrors 28, 28' by means of conventional piezoelectric transducers 44, 44'. The transducers 44, 44' are activated by electrical signals generated by feedback control circuits which include the comparators 42, 42'. The circuits including the transducers 44, 44' are so arranged that mirrors 28, 28' are moved, in response to signals from comparators 42, 42' (indicative of the difference in intensity between individual beams of the beam pairs 38, 38') to drive the difference therebetween toward zero. In this way, the length of each cavity is servoed to the single known length for which the intensities of the counterrotating beams within the cavities coincide or have a chosen constant ratio.

The counterrotating beams transmitted through the mirrors 30, 30' are combined by means of prisms 34, 34' to produce an optical signal representative of the beat frequency created by the differing frequencies of the counterrotating beams within the cavities. As is well known in the ring laser gyroscope art, this beat frequency provides the measure of rotation of the gyroscope. The optical signals as above described are applied to photodetectors 46, 46' wherein they are transformed into representative electrical signals for processing by rate detection circuitry (not shown). The rate detection circuitry, which may comprise a conventional arrangement of digital counters and the like, suitably synchronized, combines the outputs of the two cavities in such a way that their common optical bias is cancelled and the long term effects of magnetic field drift eliminated from the ultimate output.

Figure 2:
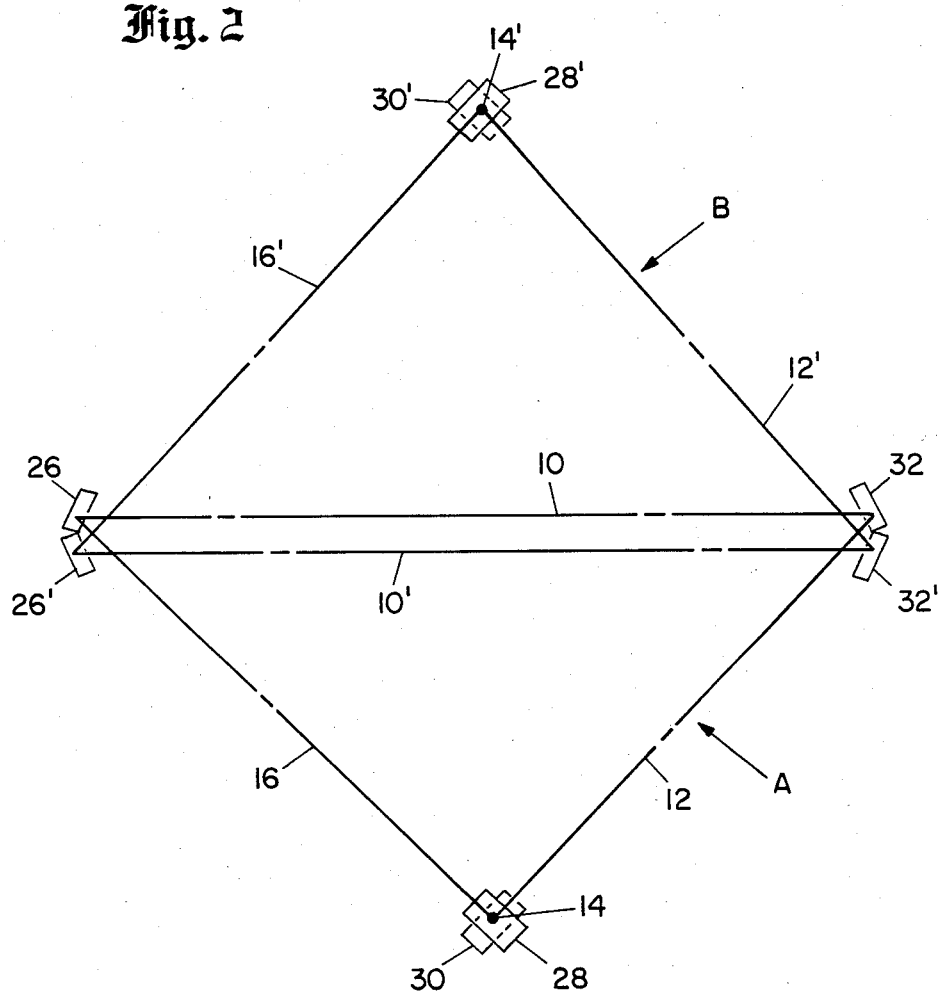
FIG. 2 is a top plan view of the optical paths of the right and left hand cavities of a ring laser gyroscope in accordance with the invention.
Figure 3:
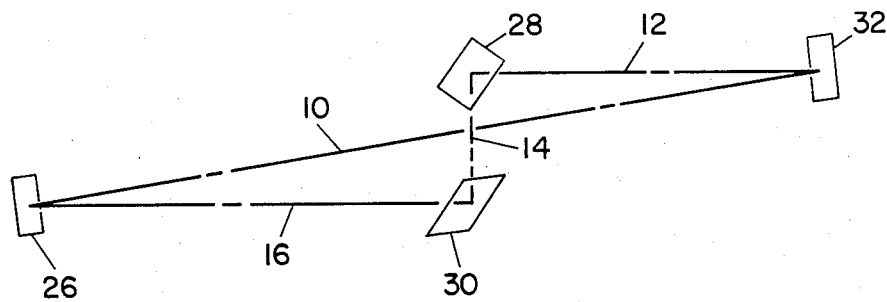
FIG. 3 is a side view of the optical path of the right hand cavity of FIGS. 1 and 2, the side view of the optical path of the left hand cavity being substantially the same.

FIG. 2 is a top plan view of the optical paths of the right hand cavity A and of the left hand cavity B. As can be seen, the cavity mirrors direct the beams in paths that define right equilateral triangles. As FIG. 3, a side view of the right hand cavity A, makes clear, segment 14 is vertically oriented, effecting an out-of-plane arrangement of the otherwise-triangular cavity. Further, as shown in FIG. 3, the cavity segments 12 and 16 lie in parallel planes that are perpendicular to segment 14 (right-hand cavity, an identical arrangement exists with regard to the left-hand cavity) and the segment 10, forming the hypotenuse of the triangle, is angularly inclined with respect to both of the aforesaid parallel planes.

While the illustrated embodiment may be preferred for fabrication and/or other purposes, the precise optical path configurations are by no means exclusively suitable for operation of the invention. Cavities A and B need only be out-of-plane; no two segments of either need be parallel in any sense nor do the connecting segments 14 and 14' necessarily have to be oriented perpendicular to one or more other cavity segments. Further, contrary to the view shown in FIG. 2, the segments of cavities A and B need not form triangular shapes; rather these cavities need only comprise out-of-plane geometries including 4-mirrored optical paths. As a design consideration, the amount of "out-of-planeness" effected by the relative lengths of segments 14 and 14' will be adjusted in accordance with the desired spacing of right and left circularly polarized cavity modes so that the cavity length may be adjusted in a manner that only one of such modes lases per cavity (the same polarisation mode in segment 10 and 10') thus cancelling the field (bias) effects and producing the desired addition of rotation effects between the cavities in accordance with the invention. Such design is well within the skill of those reasonably familiar with the laser arts.

As is well known, a non-planar empty optical cavity with four perfect dielectric reflecting mirrors will support only circularly polarized modes of light. Thus, only the circularly polarized modes of the counterrotating laser light beams are transmitted throughout both the right and left hand cavities, which are appropriate inputs for the optical biasing Faraday rotators that comprise the combinations of magnet 18 and the plasmas within the segments 10 and 10'. In the above-referenced patent of Walter, linearly polarization modes are supported in three mirror planar lasing cavities requiring the introduction of quarter wave plates into the lasing cavities to render the otherwise-linearly polarized light compatible with the Faraday biasing device. In addition, a solid element is used as the Faraday biasing material of Walter. Such elements are lossy and add optical backscatter into the cavity that can cause undesired lock-in phenomena.

Thus it is seen that there has been brought to the art a new and improved ring laser rotation rate sensor. A sensor in accordance with the invention provides the advantages of differential biasing without the introduction of lossy and otherwise disadvantageous arrangements of optical elements within its lasing cavities. Further, the invention discloses a highly advantageous method for cavity path length control that avoids the drawbacks, including mechanical complexity and reliability, of mirror dithering.

While the invention has been disclosed in its preferred embodiment, its full scope is intended to encompass all embodiments and equivalents thereto as defined in the set of claims that follow.

What is claimed is:

1. A ring laser rotational rate sensor of the type wherein counter-rotating beams of laser light are utilized to measure the rate of rotation of said sensor comprising, in combination:
   (a) first and a second lasing cavities comprising mirror images of one another and arranged substantially back-to-back;
   (b) each of said first and said second lasing cavities comprising four substantially straight segments arranged to form an out-of-plane shape, portions of said cavities intersecting so that a corresponding segment of each cavity lies entirely within the other cavity;
   (c) said cavities sharing a common fill gas;
   (d) a common cathode associated with each of said corresponding segments so that a common gas discharge laser gain medium is shared by said cavities;
   (e) a plurality of mirrors arranged adjacent the intersections of said cavity segments so that at least one circularly polarized mode may resonate within each cavity;
   (f) means for applying a common magnetic field to said gas discharge laser gain medium whereby equal and opposite optical biases are effected in said cavities; and
   (g) means for combining the energy within said first and second lasing cavities to produce a measurement of rotation of said sensor.

2. A ring laser rotational rate sensor as defined in claim 1 further characterized in that said corresponding segments of said first and second lasing cavities are closely spaced throughout their lengths.

3. A ring laser rotational rate sensor as defined in claim 2 further including means associated with each of said cavities for adjusting cavity length in response to the relative intensities of counter-rotating beams of a single circularly polarized mode.

4. A ring laser rotational rate sensor as defined in claim 3 wherein said means for applying a common magnetic field includes means for applying a common axial magnetic field along said corresponding segments of said cavities.

5. A ring laser rotational rate sensor as defined in claim 4 wherein said means for adjusting cavity length further comprises:
   (a) a prism for diverting the light within said cavity into two parallel beams, the first beam being the mode rotating in a first direction and the second being the mode rotating in the opposite direction;
   (b) means for comparing the intensities of said beams;
   (c) means for generating a signal that is a function of the difference in the intensities of said beams; and
   (d) a piezoelectric transducer for adjusting the position of a mirror within said cavity whereby the length of said cavity is thereby adjusted, said transducer being responsive to said signal.

* * * * *